US007013112B2

(12) United States Patent
Haller et al.

(10) Patent No.: US 7,013,112 B2
(45) Date of Patent: Mar. 14, 2006

(54) METHOD, SYSTEM AND COMPUTER READABLE MEDIUM FOR MAKING A BUSINESS DECISION IN RESPONSE TO INFORMATION FROM A SHORT DISTANCE WIRELESS NETWORK

(75) Inventors: Amit Haller, Belmont, CA (US); Peter Fornell, Lake Oswego, OR (US); Avraham Itzchak, Ra'anana (IL); Ziv Haparnas, Tel Aviv (IL)

(73) Assignee: IXI Mobile (Israel) Ltd., Ra'Anana (IL)

( * ) Notice: Subject to any disclaimer, the term of this patent is extended or adjusted under 35 U.S.C. 154(b) by 0 days.

(21) Appl. No.: 10/023,525

(22) Filed: Dec. 18, 2001

(65) Prior Publication Data

US 2003/0114105 A1 Jun. 19, 2003

(51) Int. Cl.
*H04B 7/00* (2006.01)

(52) U.S. Cl. ...................... 455/41.2; 455/572; 455/573; 455/426.1; 455/423; 455/424; 455/425

(58) Field of Classification Search ................ 455/41.2, 455/572–573, 423–425, 426.1, 419, 414.1, 455/403, 405, 406, 574, 429, 41.3; 705/10, 705/14, 17; 370/338, 352, 356; 709/32
See application file for complete search history.

(56) References Cited

U.S. PATENT DOCUMENTS

| 5,442,680 A | 8/1995 | Schellinger et al. |
| 5,457,737 A | 10/1995 | Wen |
| 5,572,528 A | 11/1996 | Shuen |
| 5,742,237 A | 4/1998 | Bledsoe |
| 5,771,438 A | 6/1998 | Palermo et al. |
| 5,774,791 A | 6/1998 | Strohallen et al. |
| 5,793,763 A | 8/1998 | Mayes et al. |
| 5,805,166 A | 9/1998 | Hall et al. |
| 5,838,252 A | 11/1998 | Kikinis |
| 5,896,369 A | 4/1999 | Warsta et al. |

(Continued)

FOREIGN PATENT DOCUMENTS

| JP | 3153213 | 4/2001 |
| WO | WO 99/48315 | 9/1999 |

OTHER PUBLICATIONS

Yee et al., "Integrating Bluetooth With Wireless And Ricocheting", pp. 1310–1314, 2000 IEEE.

(Continued)

*Primary Examiner*—William Trost
*Assistant Examiner*—Sharad Rampuria
(74) *Attorney, Agent, or Firm*—Vierra Magen Marcus Harmon & DeNiro LLP

(57) ABSTRACT

A method, system, and computer readable medium allows a short distance wireless network or networks to provide information to a telecommunication server, or other third party processing device, in order to make a business decision according to embodiments of the present invention. In embodiments of the present invention, the information is 1) wide area network telecommunication usage of a device in the short distance wireless network, 2) the device health, 3) the battery health of the device. In an embodiment of the present invention, the business decision includes 1) generating an invoice based on the type and manufacturer of device accessing the telecommunication network, the type and period of time of data transferred, 2) providing a replacement device 3) providing a replacement battery, 4) downloading a software component to the device for added service, 5) providing a pricing plan, 6) providing a promotional plan or 7) changing a rate schedule.

4 Claims, 13 Drawing Sheets

U.S. PATENT DOCUMENTS

| | | | |
|---|---|---|---|
| 5,929,848 A | 7/1999 | Albukerk et al. | |
| 5,978,386 A | 11/1999 | Hamalainen et al. | |
| 5,987,011 A | 11/1999 | Toh | |
| 5,987,033 A | 11/1999 | Boer et al. | |
| 6,064,734 A | 5/2000 | Hasegawa et al. | |
| 6,067,291 A | 5/2000 | Kamerman et al. | |
| 6,069,896 A | 5/2000 | Borgstahl et al. | |
| 6,078,789 A | 6/2000 | Bodenmann et al. | |
| 6,085,098 A | 7/2000 | Moon et al. | |
| 6,130,602 A | 10/2000 | O'Toole et al. | |
| 6,151,628 A | 11/2000 | Xu et al. | |
| 6,218,958 B1 | 4/2001 | Eichstaedt et al. | |
| 6,223,029 B1 | 4/2001 | Stenman et al. | |
| 6,243,581 B1 | 6/2001 | Jawanda | |
| 6,265,788 B1 | 7/2001 | Davidson et al. | |
| 6,282,183 B1 | 8/2001 | Harris et al. | |
| 6,298,443 B1 | 10/2001 | Colligan et al. | |
| 6,326,926 B1 | 12/2001 | Shoobridge et al. | |
| 6,333,973 B1 | 12/2001 | Smith et al. | |
| 6,343,276 B1 * | 1/2002 | Barnett | 705/28 |
| 6,434,537 B1 | 8/2002 | Grimes | |
| 6,446,127 B1 | 9/2002 | Schuster et al. | |
| 6,452,910 B1 | 9/2002 | Vij et al. | |
| 6,459,882 B1 | 10/2002 | Palermo et al. | |
| 6,463,078 B1 | 10/2002 | Engstrom et al. | |
| 6,487,180 B1 * | 11/2002 | Borgstahl et al. | 370/310 |
| 6,519,460 B1 | 2/2003 | Haartsen | |
| 6,532,366 B1 | 3/2003 | Chung et al. | |
| 6,600,428 B1 | 7/2003 | O'Toole et al. | |
| 6,600,734 B1 | 7/2003 | Gernert | |
| 6,630,925 B1 | 10/2003 | Östergård et al. | |
| 6,633,759 B1 | 10/2003 | Kobayashi | |
| 6,636,489 B1 | 10/2003 | Fingerhut | |
| 6,654,616 B1 | 11/2003 | Pope et al. | |
| 6,665,549 B1 * | 12/2003 | Reed | 455/573 |
| 2002/0037700 A1 * | 3/2002 | Dooley et al. | 455/41 |
| 2002/0055333 A1 * | 5/2002 | Davies et al. | 455/41 |
| 2002/0058502 A1 * | 5/2002 | Stanforth | 455/422 |
| 2002/0063472 A1 | 5/2002 | Irvin | |
| 2002/0065817 A1 | 5/2002 | Ito et al. | |
| 2002/0068559 A1 * | 6/2002 | Sharma et al. | 455/423 |
| 2002/0068600 A1 | 6/2002 | Chihara et al. | |
| 2002/0069037 A1 * | 6/2002 | Hendrickson et al. | 702/186 |
| 2002/0082054 A1 | 6/2002 | Keinonen et al. | |
| 2002/0086718 A1 * | 7/2002 | Bigwood et al. | 455/572 |
| 2002/0091633 A1 | 7/2002 | Proctor | |
| 2002/0102974 A1 | 8/2002 | Raith | |
| 2002/0118663 A1 | 8/2002 | Dorenborsch et al. | |
| 2002/0128051 A1 * | 9/2002 | Liebenow | 455/574 |
| 2002/0142762 A1 | 10/2002 | Chmaytelli et al. | |
| 2002/0143952 A1 | 10/2002 | Sugiarto et al. | |
| 2002/0155830 A1 * | 10/2002 | Iyer | 455/424 |
| 2002/0160764 A1 * | 10/2002 | Gorsuch | 455/419 |
| 2003/0013438 A1 | 1/2003 | Darby | |
| 2003/0017810 A1 | 1/2003 | Janninck et al. | |
| 2003/0027563 A1 * | 2/2003 | Herle et al. | 455/419 |
| 2003/0032417 A1 | 2/2003 | Minear et al. | |
| 2003/0050058 A1 * | 3/2003 | Walsh et al. | 455/41 |
| 2003/0054765 A1 | 3/2003 | Botteck | |
| 2003/0060188 A1 | 3/2003 | Gidron | |
| 2003/0060189 A1 | 3/2003 | Minear et al. | |
| 2003/0078036 A1 | 4/2003 | Chang et al. | |
| 2003/0091917 A1 | 5/2003 | Davenport et al. | |
| 2003/0114105 A1 | 6/2003 | Haller et al. | |
| 2003/0115351 A1 | 6/2003 | Giobbi | |
| 2003/0122856 A1 | 7/2003 | Hubbard | |
| 2003/0153280 A1 | 8/2003 | Kopp et al. | |
| 2003/0187807 A1 | 10/2003 | Matsubara et al. | |
| 2003/0214940 A1 | 11/2003 | Takken | |
| 2003/0224773 A1 | 12/2003 | Deeds | |
| 2003/0232616 A1 | 12/2003 | Gidron et al. | |
| 2004/0001467 A1 | 1/2004 | Cromer et al. | |
| 2004/0048671 A1 | 3/2004 | Rowe | |

OTHER PUBLICATIONS

Haartsen, "BLUETOOTH—The universal radio interface for ad hoc wireless connectivity", pp. 110–117, Ericsson Review No. 3, 1998.

Karagiannis, "Mobility support for ubiquitous Internet access", ERICSSON Open report, pp. 1–70, Dec. 21, 2000.

White Paper, Handheld Devices: Comparing the Major Platforms, www.dell.com/r&d, Dec. 2000.

Miyatsu, Bluetooth Design Background and Its Technological Features, IEICE Trans, Fundamentals, vol. E83–A, No. 11, Nov. 2000.

Parekh, Operating Systems on Wireless Handheld Devices, A Strategic Market Analysis, Massachussettes Institute of Technology, Sep. 28, 2000.

Johansson, et al., Short Range Radio Based Ad–hoc Netowrking: Performance and Properties, IEEE, 1999.

Guthery et al., "The WebSIM—Clever Smartcards Listen to Port 80", version 15.12.99.

Project P946–GI, Smart Devices "When Things Start to Think", Jan. 2000, 2000 EURESCOM Participants in Project P946–GI.

* cited by examiner

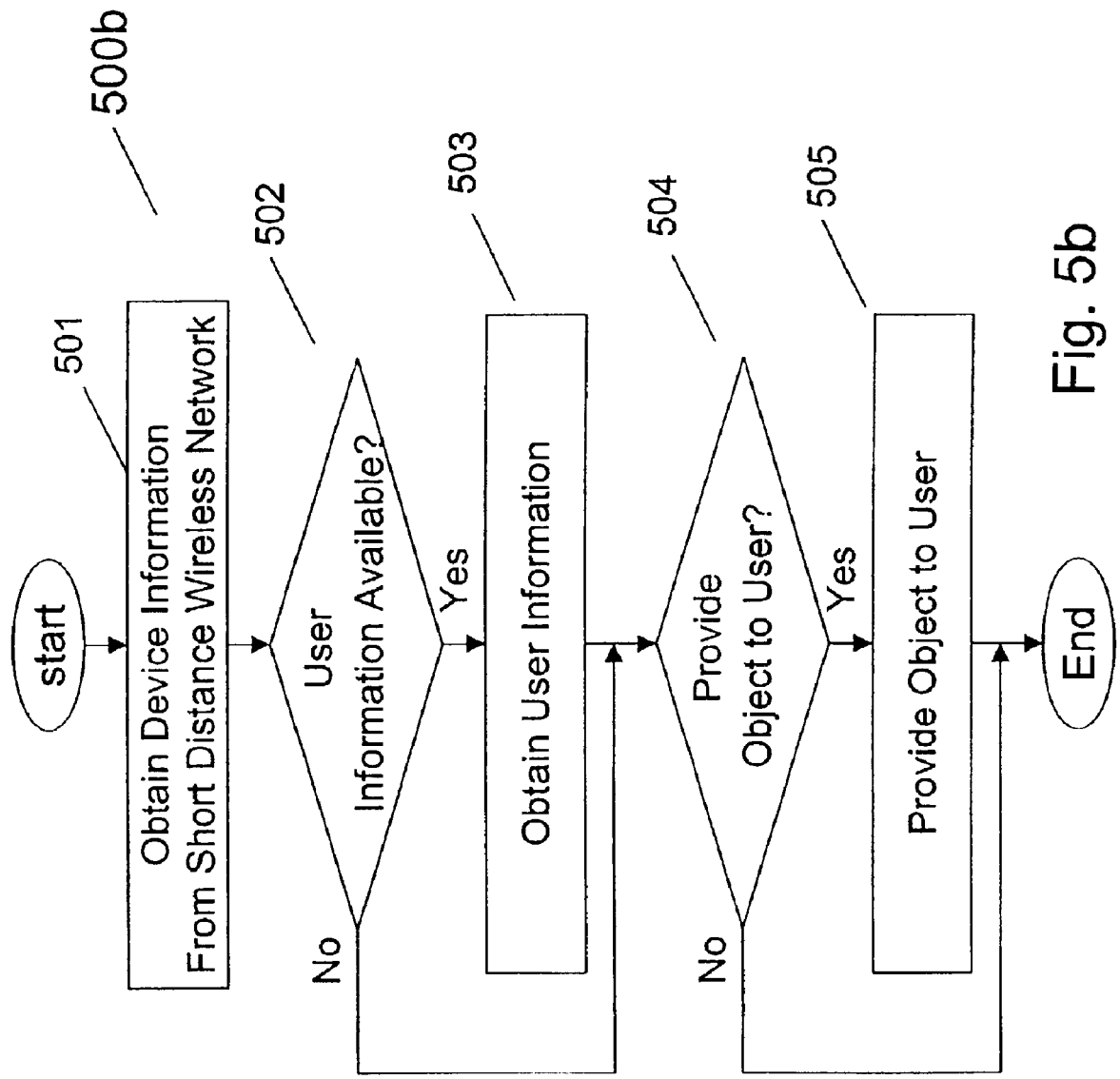

METHOD, SYSTEM AND COMPUTER READABLE MEDIUM FOR MAKING A BUSINESS DECISION IN RESPONSE TO INFORMATION FROM A SHORT DISTANCE WIRELESS NETWORK

FIELD OF THE INVENTION

This invention relates generally to a network.

BACKGROUND OF THE INVENTION

A wireless communication device, such as a cellular telephone, is typically a node of a WAN or communication network. The cellular telephone may also be a part of a short distance wireless network for communicating with other user devices, such as a laptop, printer, Personal Digital Assistant ("PDA") and/or headset. For example, Bluetooth™ technology (www.Bluetooth.com) provides wireless communications between devices in a short distance wireless network.

A telecommunication network operator does not typically have visibility of the usage of many of the devices in the short distance wireless network that ultimately use the telecommunication network. Typically, a device in the short distance wireless network will access the telecommunication network through a cellular telephone or cellular modem. The telecommunication network operator sees the usage of the telecommunication network by a node, or a cellular telephone that is also in a short distance wireless network, even though other devices in the short distance wireless network are causing the usage of the telecommunication network by receiving or sending information from or to the cellular telephone. For example, a user may send an email from a PDA, in a short distance wireless network via a cellular telephone, that includes an image file or video. Transferring this email over the telecommunication network uses a relatively large amount of bandwidth and is costly to the user during peak usage times compared to a short telephone call. Because of the cost associated with transferring the email, a user may choose not to send the email over the telecommunication network. Likewise, the user may not download a rather large file from a web site because of the relatively high costs associated with using the telecommunication network during peak usage times. Accordingly, a telecommunication network operator loses potential revenue because users are not accessing the telecommunication network; while, users are not obtaining desirable information and services.

Similarly, a user of a short distance wireless network has numerous devices that may have batteries. Both the devices and batteries may need to be replaced if they fail or are about to fail. A user is often responsible for determining whether the device and/or battery needs to be replaced and has to travel to a store to obtain a replacement device and/or battery. The user is then not able to access the telecommunication network due to the failed device and/or battery and the telecommunication network provider loses the opportunity of generating any revenue associated with the failed device/battery.

Therefore, it is desirable to provide a method, a system, and a computer readable medium that increases telecommunication network operator traffic, and thereby revenue, while providing convenience and value added services to users.

SUMMARY OF THE INVENTION

A method, system, and computer readable medium allows a short distance wireless network or networks to provide information to a telecommunication server, or other third party processing device, in order to make a business decision according to embodiments of the present invention. In embodiments of the present invention, the information is 1) wide area network telecommunication usage of a device in the short distance wireless network, 2) the device health, 3) the battery health of the device, 3) device type, 4) device manufacturer and/or 5) device usage statistics. In an embodiment of the present invention, the business decision includes 1) generating an invoice based on the type of device (including manufacture) accessing the telecommunication network, the type and period of time of data transferred, 2) providing a replacement device 3) providing a replacement battery, 4) downloading a software component to the device for added service, 5) providing a pricing plan, 6) providing a promotional plan or 7) changing a rate schedule.

According to an embodiment of the present invention, a method for making a business decision is provided. Device information is obtained from a device in a short distance wireless network. A user of the short distance wireless network is provided with an object responsive to the device information.

According to an embodiment of the present invention, the device is a cellular telephone or cellular modem.

According to an embodiment of the present invention, the device stores device information of other devices in the short distance wireless network.

According to an embodiment of the present invention, the device is a Bluetooth™ device communicating with a cellular device.

According to an embodiment of the present invention, the obtaining step further includes the step of obtaining user information from a database in a wide area network. The providing step is responsive to the device information and the user information.

According to an embodiment of the present invention, the device information includes an indication of the battery life of the device and the object is a battery.

According to an embodiment of the present invention, the providing steps include the step of mailing the battery to the user.

According to an embodiment of the present invention, the device information includes the health of the device and the object includes a replacement device.

According to an embodiment of the present invention, the device information is a telecommunication usage of the device on the wide area network and the object is an invoice of charges associated with the telecommunication usage.

According to an embodiment of the present invention, the user information includes a pricing plan of the user and the wide area network includes a cellular network.

According to an embodiment of the present invention, the charges are a function of device type, manufacturer, period of time of the telecommunication usage or type of data transferred during the telecommunication usage.

According to an embodiment of the present invention, the information is a telecommunication usage on a wide area network and the object is a message for limiting the telecommunication usage.

According to still a further embodiment of the present invention, the obtaining step further comprises steps of generating a short-range radio signals, containing the information, from a Bluetooth™ device to a cellular device. The cellular signal is generated, containing the information, from the cellular device to a processing device in a wide area network.

According to an embodiment of the present invention, the generating a short-range radio signals is responsive to the user input or generated periodically.

According to an embodiment of the present invention, the generating a short-range radio signals is responsive to a request from a processing device in the wide area network.

According to an embodiment of the present invention, generating a short-range radio signals is responsive to a comparison between a threshold value and a device value.

According to an embodiment of the present invention, the obtaining step further comprises the step of generating a cellular signal, containing the device information, responsive to a request message. The request message is generated periodically.

According to an embodiment of the present invention, the device includes a short-range radio processor and a 2.4 or 5.7 GHZ transceiver.

According to an embodiment of the present invention, the device is selected from a group consisting of a desktop computer, a laptop computer, a personal digital assistant, a headset, a page, a printer, a thin terminal, a watch, a digital camera or an equivalent, According to an embodiment of the present invention, the short distance wireless network is a Bluetooth™ network.

According to an embodiment of the present invention, a system for providing an object to the user of short distance wireless network is provided. The system comprises a device for generating a short-range radio signal containing device information. A cellular device generates a cellular signal, containing the device information, responsive to short range radio signal. A processing device, having a database containing user information, provides an object to the user in response to the device information and the user information.

According to an embodiment of present invention, an article of manufacture, including a computer readable medium is provided. The article comprises a short-range radio software component for receiving a short-range radio signal, containing usage information of the device, in a short distance wireless network responsive to a message request. The article also comprises a cellular software component for generating the cellular signal, containing the usage information of the device, in the cellular network.

Other aspects and advantages of the present invention can be seen upon review of the figures, the detailed description, and the claims that follow.

BRIEF DESCRIPTION OF THE FIGURES

FIGS. 5b–f are flowcharts illustrating providing an object in response to information from a short distance wireless network according to an embodiment of the present invention.

DETAILED DESCRIPTION

I. System Overview

Figure 1A:
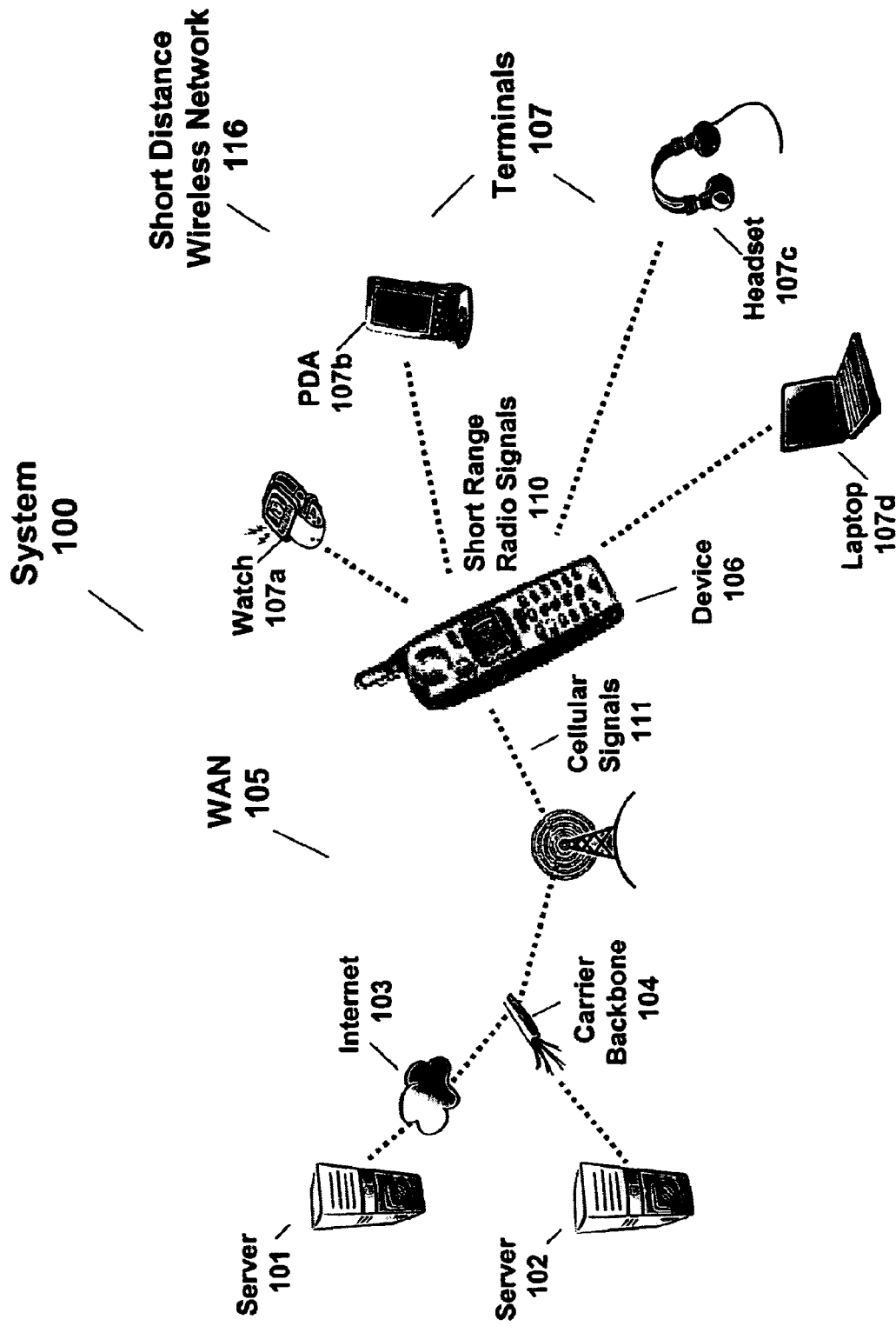
FIGS. 1a–b illustrates a system according to an embodiment of the present invention.

The following description and claims relate to a method, a system, and a computer readable medium for making a business decision responsive to obtaining information from a short distance wireless network 116, as illustrated by FIG. 1a, according to an embodiment of the present invention.

The information from a short distance wireless network 116, in an embodiment of the present invention, includes device status information, such as the health of a device in a short distance wireless network 116 or whether a device has to be replaced soon. Similarly, the information includes the health of a battery that may need to be replaced. In an alternate embodiment of the present invention, the information includes usage information of a WAN 105, coupled to short distance wireless network 116, that may include a telecommunication cellular network. The usage information includes 1) a type of device (e.g. cellular telephone 106, laptop 107d, PDA 107b) accessing WAN 105 or causing WAN 105 to be accessed, 2) a manufacture of the device accessing WAN 105 or causing WAN 105 to be accessed, 3) type of data transferred (e.g. voice, image, video) over WAN 105, and 4) a period of time accessing WAN 105 or causing WAN 105 to be accessed, singly or in combination, in an embodiment of the present invention.

Figure 1B:
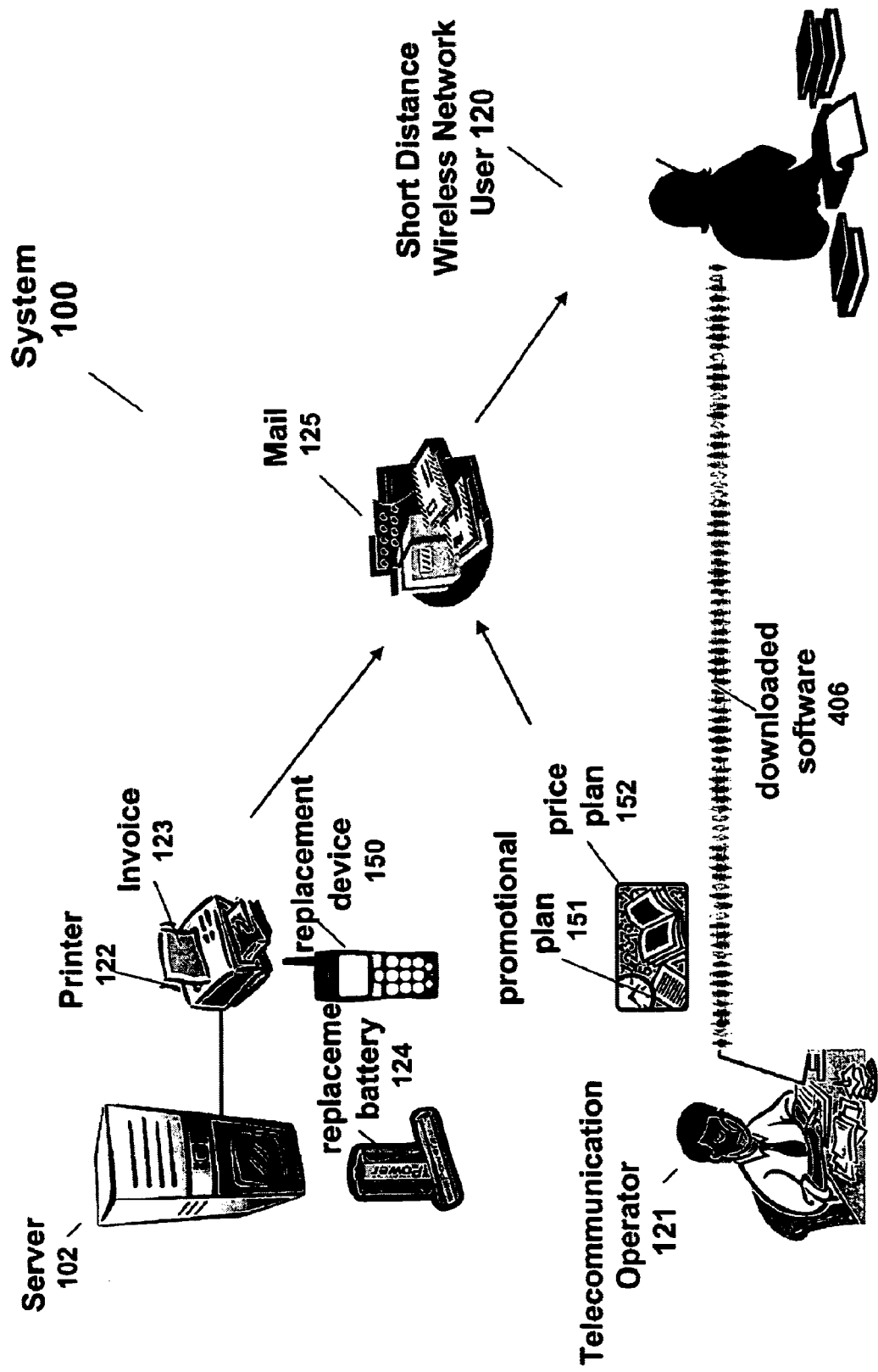

A business decision made in response to information obtained from short distance wireless network 116 includes providing an object to a user 120, as illustrated in FIG. 1b, in an embodiment of the present invention. The object may include an invoice 123, a replacement device 150, a replacement battery 124, a promotional plan 151, a price plan 152, a software component 416, or an equivalent, singly or in combination, in an embodiment of the present invention. An object, such as a promotional plan, may be provided to multiple users of respective short distance wireless networks or provided to the public in an embodiment of the present invention. In an alternate embodiment of the present invention, an object may not be provided. For example, a telecommunication operator 121 may adjust rates or usage charges based on the information obtained from short distance wireless network 116 and other short distance wireless networks.

In an embodiment of the present invention, a short distance wireless network 116 is a network of processing devices, such as a personal computer or headset, that span a relatively small physical area, wherein at least one device generates and receives a short-range radio signal for communicating with another device in the network. In an embodiment of the present invention, a short-range radio signal can travel between approximately 0 and approximately 1000 feet. An example of a short distance wireless network includes a network of devices formed by Bluetooth™, HomeRF, 802.11 technologies, singly or in combination, or an equivalent. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple LANs and/or short distance wireless networks connected over a relatively large distance. Telephone lines and electromagnetic signals, singly or in combination, couple the LANs and/or short distance wireless networks in a WAN. In an embodiment of the present invention, WAN 105 includes a cellular network generating and receiving cellular signals 111. In an embodiment of the present invention, a cellular network is defined as a communications system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

Figure 3A:
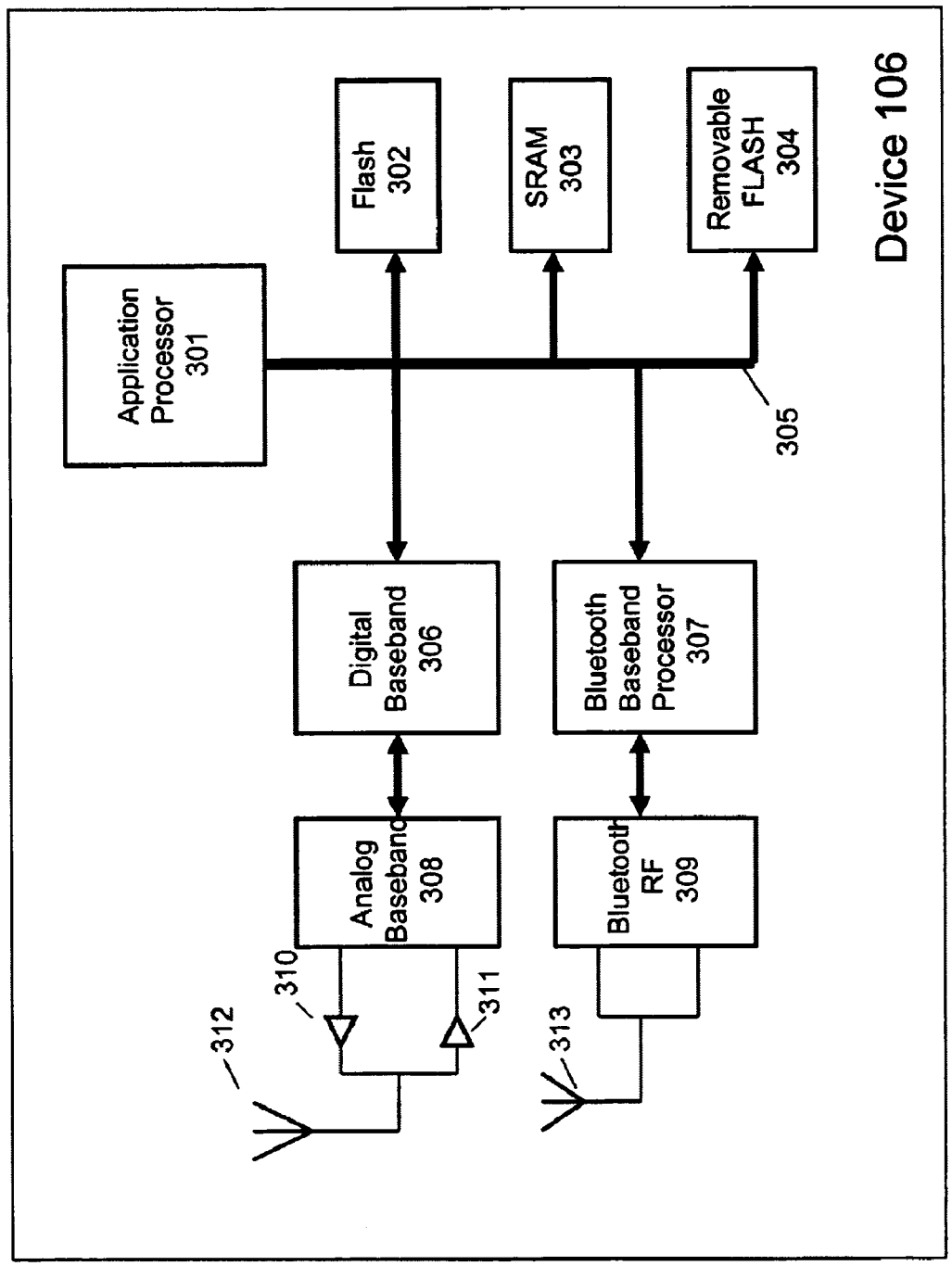
FIGS. 3a–b are hardware block diagrams of devices according to an embodiment of the present invention.
Figure 3B:
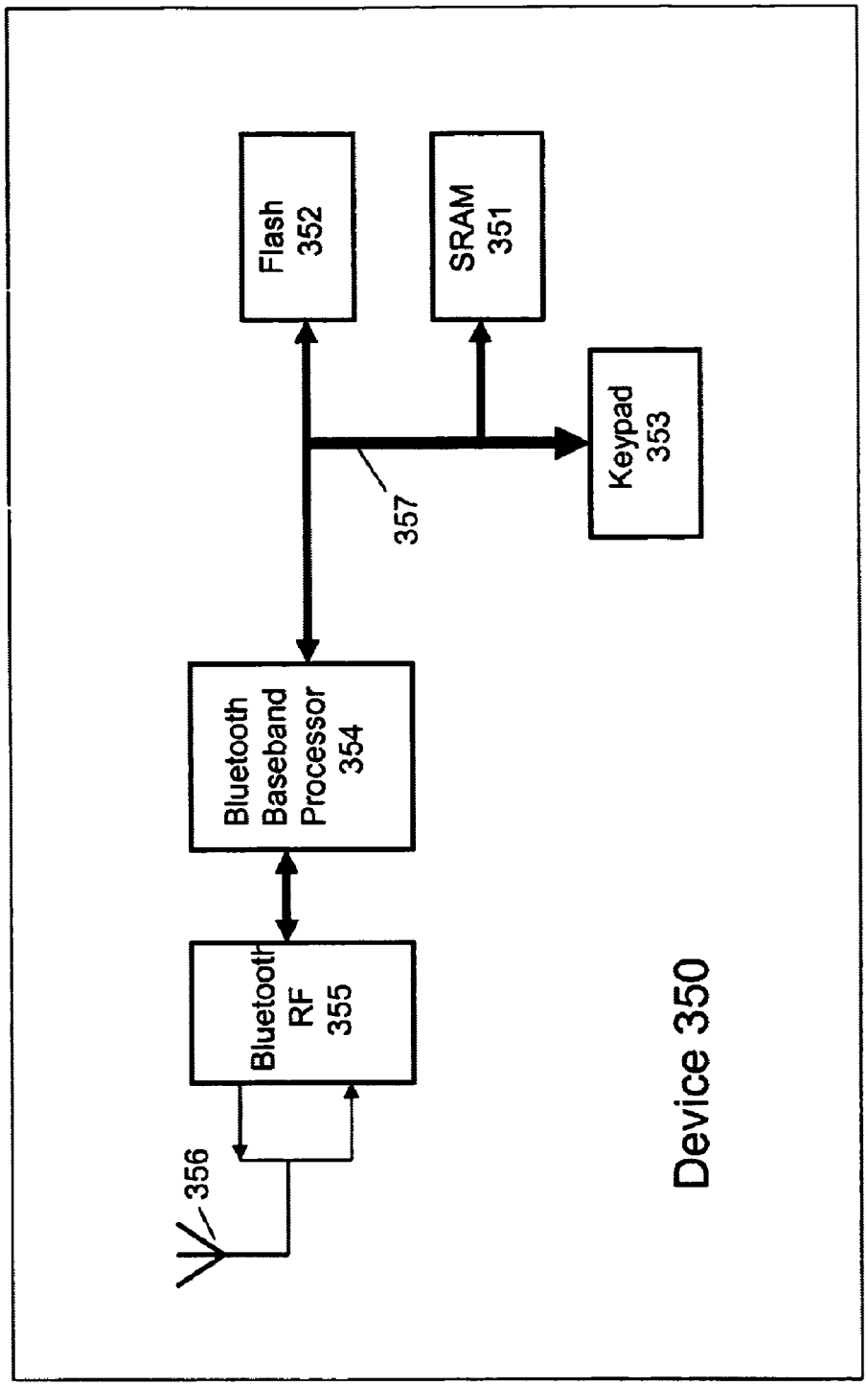

FIG. 1a illustrates system 100 according to an embodiment of the present invention. System 100 includes other devices, or terminals 107, coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include watch 107a, PDA 107b, headset 107c and laptop computer 107d. In an alternate embodiment, fewer or more terminals are used in short distance wireless network 116. In an alternate embodiment, terminals 107 include a desktop computer, a pager, a printer, a thin terminal, messaging terminal, a digital camera or an equivalent. In an embodiment of the present invention, terminals 107 include a Bluetooth™ 2.4 GHz transceiver. Likewise, device 106 includes a Bluetooth™ 2.4 GHZ transceiver. In an alternate embodiment of the present invention, a Bluetooth™ 5.7 GHz transceiver is used. Hardware for device 106 and terminals 107 is illustrated in FIGS. 3a–b in an embodiment of the present invention.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000, Universal Mobile Telecommunications System ("UMTS"), Time Division Multiple Access ("TDMA"), or General Packet Radio Service ("GPRS") protocol or an equivalent is used.

In an embodiment of the present invention, WAN 105 includes carrier backbone 104, server 101–102 and Internet 103. In an embodiment of the present invention, IP packets are transferred between the components illustrated in FIG. 1a In alternate embodiments of the present invention, other packet types are transferred between the components illustrated in FIG. 1a.

In an embodiment of the present invention, a WAN 105 includes an IP public or private network, such as a corporate secured network using a Virtual Private Network ("VPN").

In an alternate embodiment of the present invention, device 106 is coupled to a WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide information, such as a web site having web pages or application software components, to terminals 107 by way of device 106. In an embodiment of the present invention, terminals 107 share services and communicate by way of device 106.

Figure 6:
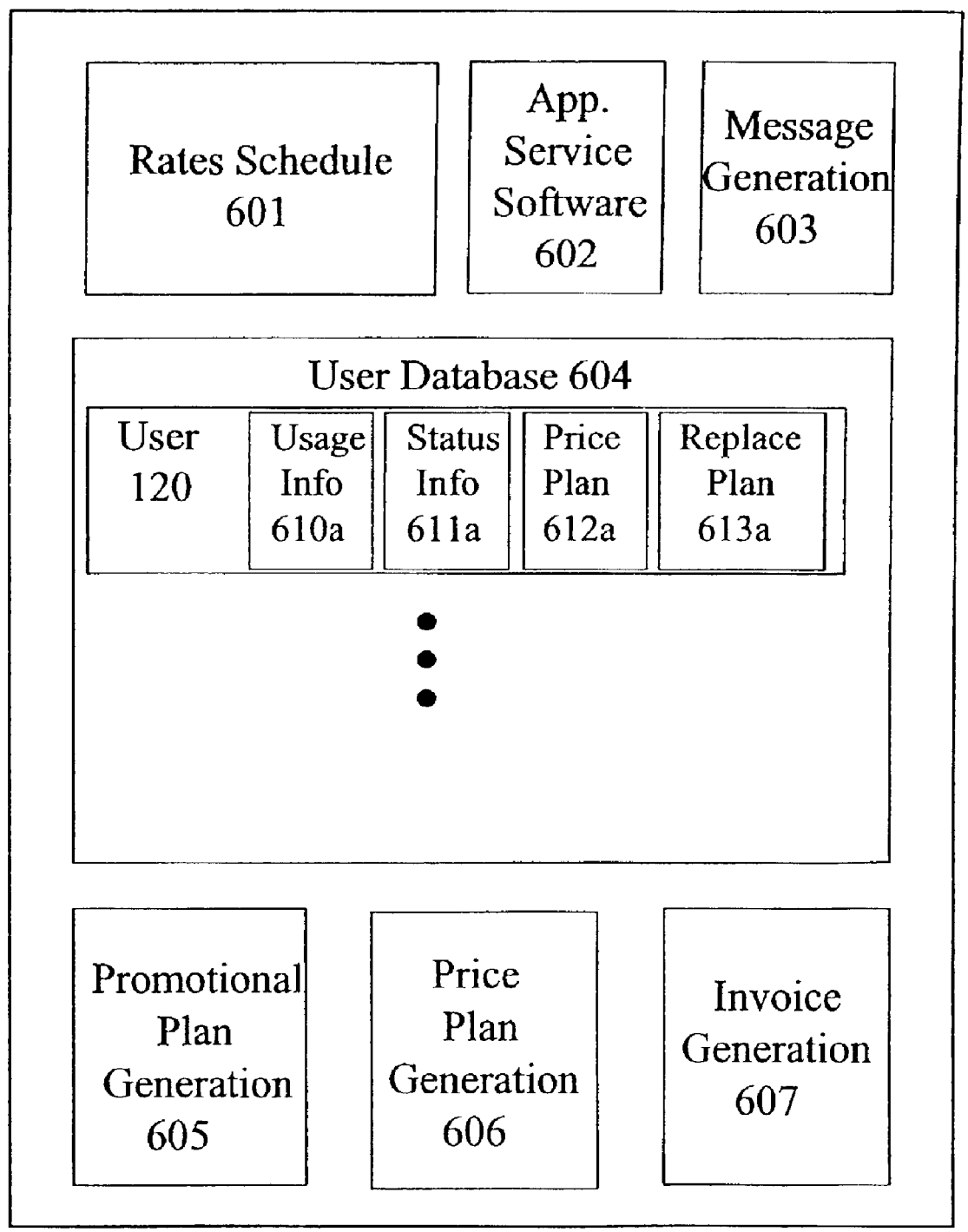
FIG. 6 illustrates a software block diagram architecture of server 101 according to an embodiment of the present invention.

In an embodiment of the present invention, server 101 includes rates schedule software component 601, application service software component 602, message generation software component 603, user database 604, promotional plan generation software component 605, price plan generation software component 606 and invoice generation software component 607, singly or in combination, as illustrated in FIG. 6

User database 604 includes information on users of short distance wireless networks in an embodiment of the present invention. For example, user database 604 includes a record for user 120 that includes usage information 610a, status information 611a, price plan 612a and replacement plan 613a, singly or in combination, in an embodiment of the present invention.

Usage information 610a includes telecommunication WAN usage of user 120 devices' in a short distance wireless network 116. For example, usage information 610a may store that PDA 107b accessed WAN 105, via device 106, to email two images between 3:45 p.m. and 3:47 p.m. on Monday, Nov. 26, 2001. In an alternate embodiment, more or less detail may be stored.

Status information 611 a includes the status or health of devices and batteries in a short distance wireless network 116. For example, status information 611a may indicate PDA 107b has a battery that needs to be replaced. Alternatively, status information 611a may indicate that cellular modem 106 needs to be replaced.

Price plan 612a includes a price plan for user 120. For example, user 120 has a contract with a telecommunication operator 121 that allows for downloading MP3 music files over WAN 105 to short distance wireless network 116 at $2.00 per file between 8:00 p.m. and 6:00 a.m., and $10.00 per file between 6:00 a.m. and 8:00 p.m. This pricing plan encourages users to download large files during off peak usage times of WAN 105 and also allows for the telecommunication operator 121 to generate increased revenue. A user also benefits by obtaining data, such as music files that are not time sensitive, in economical manner. Price plan 612a also includes a maximum periodic charge for unlimited usage of a particular type of device and/or data type in an embodiment of the present invention. Other similar price plans may be used for other types of or manufacturers of devices, data and/or time periods to increase telecommunication operator 121 revenue and also provide value added services to customers.

Replacement plan 613a includes a replacement plan for user 120. For example, a user 120 has a contract with a telecommunication operator 121, or other third party, to provide replacement batteries when a battery of a device, or terminals 107, in short distance wireless network 116 fails or is about to fail. Replacement plan 613a indicates whether a user 120 desires a replacement battery and/or replacement device to be provided. In an embodiment of the present invention, a replacement battery is mailed to user 120 when a failure or eminent failure of a battery is detected. Telecommunication operator 121 generates additional revenue by selling batteries and user 120 has the value added service of not having to 1) determine whether a battery needs to be replaced and 2) travel and shop for a replacement battery.

Rates schedule software component 601 stores a schedule of rates for accessing WAN 105 by type of device accessing WAN 105 or causing to access WAN 105, manufacturer of device accessing WAN 105 or causing to access WAN 105, type of data transferred on WAN 105 and time period of accessing WAN 105, singly or in combination, in an embodiment of the present invention. For example, a telecommunication operator 121 may charge $0.25 per minute for a voice call between 6:00 p.m. and 8:00 p.m. and $1.00 for transferring a 2 megabyte file from a Dell™ laptop in short distance wireless network 116 at midnight. In an another example in which a manufacturer is promoting the purchase of their products by subsidizing telecommunication usage, a user is charged $1.50 for transferring a 2 megabyte file from a Compaq™ laptop at any time during the day when the same user is charged much more when using another manufacturer's laptop. In still another embodiment of the present invention, a user is charged differently depending upon the software application used. For example, a user may be charged a first rate for using an email application program to send an email and a second rate for using a MP3 application software program for downloading a MP3 music file.

Invoice generation software component 607 generates an invoice 123 for user 120 in an embodiment of the present invention. Invoice 123 is printed out on printer 122 and mailed to user 120, as illustrated in FIG. 1b, in an embodiment of the present invention. In an alternate embodiment of the present invention, invoice 123 is emailed to user 120. Invoice generation software component 607 accesses user database 604, and in particular usage information 610a and price plan 612a, in generating invoice 123. In an embodiment of the present invention, invoice generation software component determines if usage times are within price plan maximum charges. In an alternate embodiment, invoice generation software component 607 access rates schedule software component 601 in order to obtain the appropriate rates that are multiplied by usage times in usage information 610a to obtain a total periodic charge on invoice 123.

Promotional plan generation software component 605 generates a promotional plan for user 120 or other potential users. Promotional plan generation software component 605 analyzes information in user database 604 in order to determine a plan for providing value to users and additional revenue to operator 121. For example, promotional plan generation software 605 will determine which users download MP3 files during peak WAN load times and may be unsuccessful in completing the download due to dropped signals. Operator 121 may generate a promotional plan provided to these selected users for downloading the MP3 files during off peak times at discounted rates. Operator 121 is able to generate added revenue during off peak times and a user 120 is able to receive reduce rates.

Other promotional plans includes providing free access time to purchasers of devices having a specific manufacturer. A manufacturer of a headset 107c may want to promote sells of the headset by offering 100 free WAN 105 access minutes. Promotional plan generation software component 605 determines which users in users database 604 has purchased that particular manufactured headset and adjusts the price plan 612a to reflect the 100 free minutes.

Likewise, operator 121 may provide free or discounted devices to user 120 based on usage information 610a. Usage information 610a may indicate that a user does not have a PDA in short distance wireless network 116; yet, user 120 actively uses a cellular telephone. The free or discounted PDA will provide value to user 120 and also provide an opportunity for increased revenue for operator 121 by user 120 also accessing WAN 105 with the new PDA. Thus, both the operator 121 and user 120 benefit by increased revenue and a free PDA, respectively, when operator 121 knows which users in user database 604 tend to use a PDA often.

Price plan generation software component 606 generates a price plan for user 120 based on information in user database 604. For example, price plan generation 606 compares usage information 610a and replacement plan 613a to existing price plans to determine if user 120 can obtain additional services. For example, if user 120 uses a large amount of access time on WAN 105, but does not have a replacement plan, price generation software component generates a price plan that puts a maximum charge on usage time, saving user 120 charges, if user 120 signs up for a battery replacement plan. The new price plan may be mailed or emailed to user 120 in an embodiment of the present invention.

Application service software component 602 includes software components that can be downloaded directly to a targeted terminal in terminal 107 in an embodiment of the present invention. Accordingly, a user 120 does not have to travel to a telecommunication operator service department, or other third party vendor, to have the software loaded into a terminal in order to obtain the added service. For example, user 120 has a MP3 headset manufactured by Sony™ and another MP3 headset manufactured by Panasonic™ in short distance wireless network 116. Based on information obtained from short distance wireless network 116, telecommunication operator 121 or another third party downloads 1) an application software component to the Sony™ headset that enables free MP3 downloads from a website and 2) an application software component to the Panasonic™ headset that enables special effects. The software application components could not be downloaded to the targeted terminal or terminals without first obtaining information about the terminals, such as manufacturer and type, in short distance wireless network 116.

Message generation software component 603 generates a message to short distance wireless network 116, and in particular to device 106 or terminals 107. In an embodiment of the present invention, the message may include software for preventing a particular device from having access to WAN 105. In an alternate embodiment, message generation software component 603 generates the results of promotional plan generation software component 605 and/or price plan generation software component 606 to operator 121. Base on these results, operator 121 may change rates in rates schedule software component 601. In an alternate embodiment of the present invention, message generation software component 603 generates a message to a third party to provide a replacement device or battery to user 120.

In an embodiment of the present invention, server 101 generates a message transferred over WAN 105 to device 106 to obtain information from short distance wireless network 116. In an embodiment of the present invention, the message is an Internet/Protocol ("IP") message. In an embodiment of the present invention, the information from short distance wireless network 116 includes the type of terminals, including terminal manufacturer, accessing WAN 105, the type of data transferred on WAN 105, and the period of time when the data is transferred on WAN 105, singly or in combination. In an embodiment of the present invention, the information is transferred in response to a user input. In an alternate embodiment of the present invention, the information is generated periodically from device 106, or from terminals 107 generating a Bluetooth™ message to device 106 that then generates cellular signals 111 to WAN 105. In an embodiment of the present invention, device 106 stores device information, such as device type, model and manufacturer, of terminals 107 in short distance wireless network 116. Device 106 collects and logs the usage of various terminals 107 accessing WAN 105 in an embodiment of the present invention. This logged information and/or device information may then be transferred to server 101 periodically, in response to a message request or user input.

Server 102, coupled to carrier backbone 104, has similar software components described above and bypasses Internet 103 in an alternate embodiment of the present invention.

II. Hand-held Device/Terminal Hardware

Figure 2:
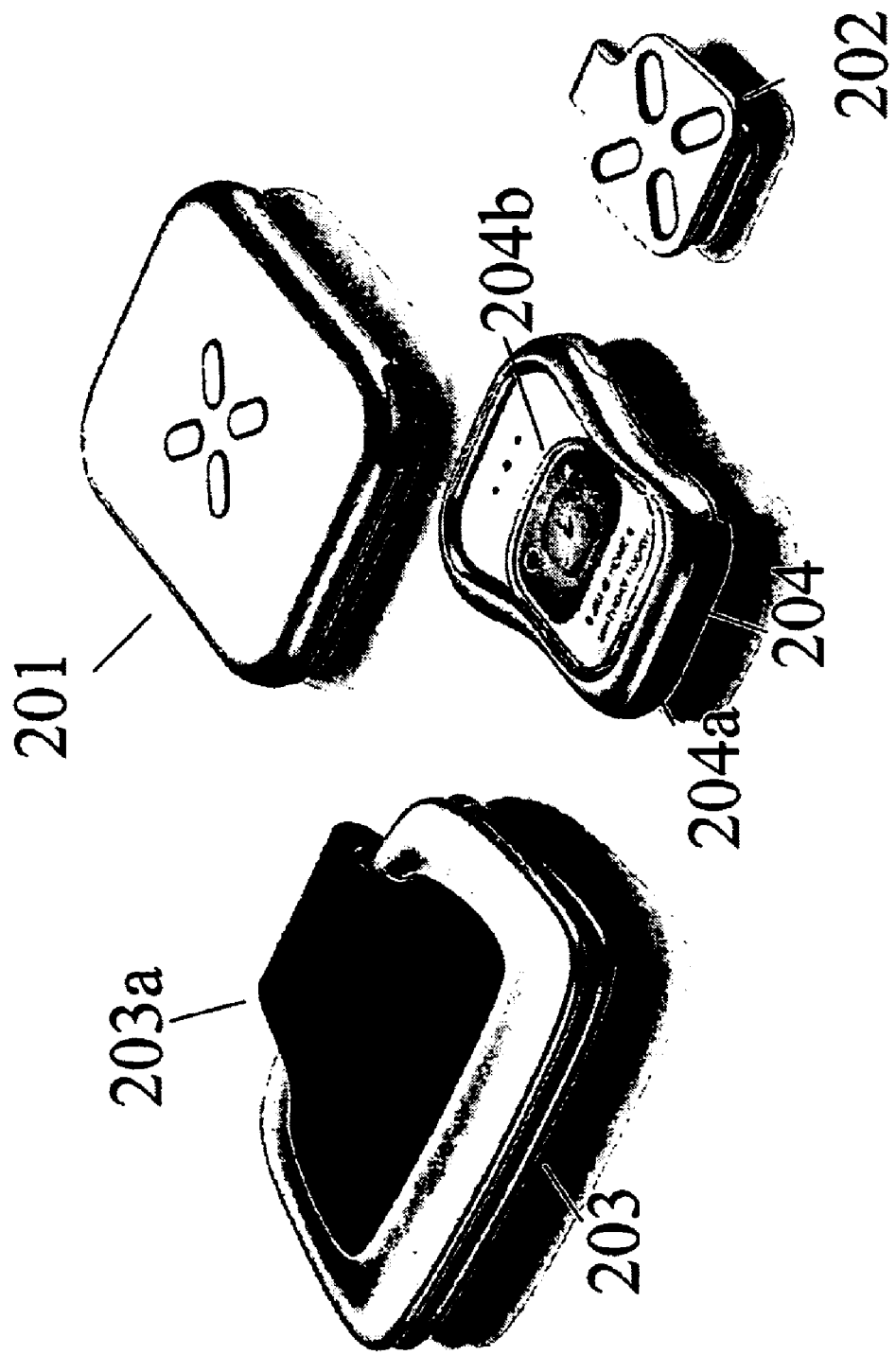
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107d and PDA 107b are smart terminals. Thin terminals have a relatively low power processing unit and operating system. They are mainly used as peripherals to an application server in a short distance wireless network 116 and their main task is user interaction, rendering output for a user and providing an application server with a users input. For example, a watch 107a or messaging terminals can be thin terminals.

FIG. 2 illustrates thin terminals. Voice terminal 204 includes a display 204b and a retractable keypad 204a. Messaging Terminal 203 is illustrated in a closed position with a hinge 203a used to open and close terminal 203. Terminal 203 also includes a miniature QWERTY keyboard and display when opened.

In an embodiment of the present invention, device 201 is a cellular modem and includes a clip 202 for a belt.

FIG. 3a illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM")) and static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1a, or device 350 illustrated in FIG. 3b.

Cellular, such as GSM, signals are transmitted and received using digital circuit 306, analog circuit 308, transmitter 310, receiver 311 and antenna 312. Digital circuit 306 is coupled to bus 305. In alternate embodiments, device 106 includes a display, a speaker, a microphone, a keypad and a touchscreen, singly or in combination.

FIG. 3b illustrates device 350 that is a hand-held device in an embodiment of the present invention. Device 350, in an embodiment of the present invention, is one of the terminals 107 illustrated in FIG. 1a. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107d, a disk drive and other input/output components are present.

III. Software

Figure 4:
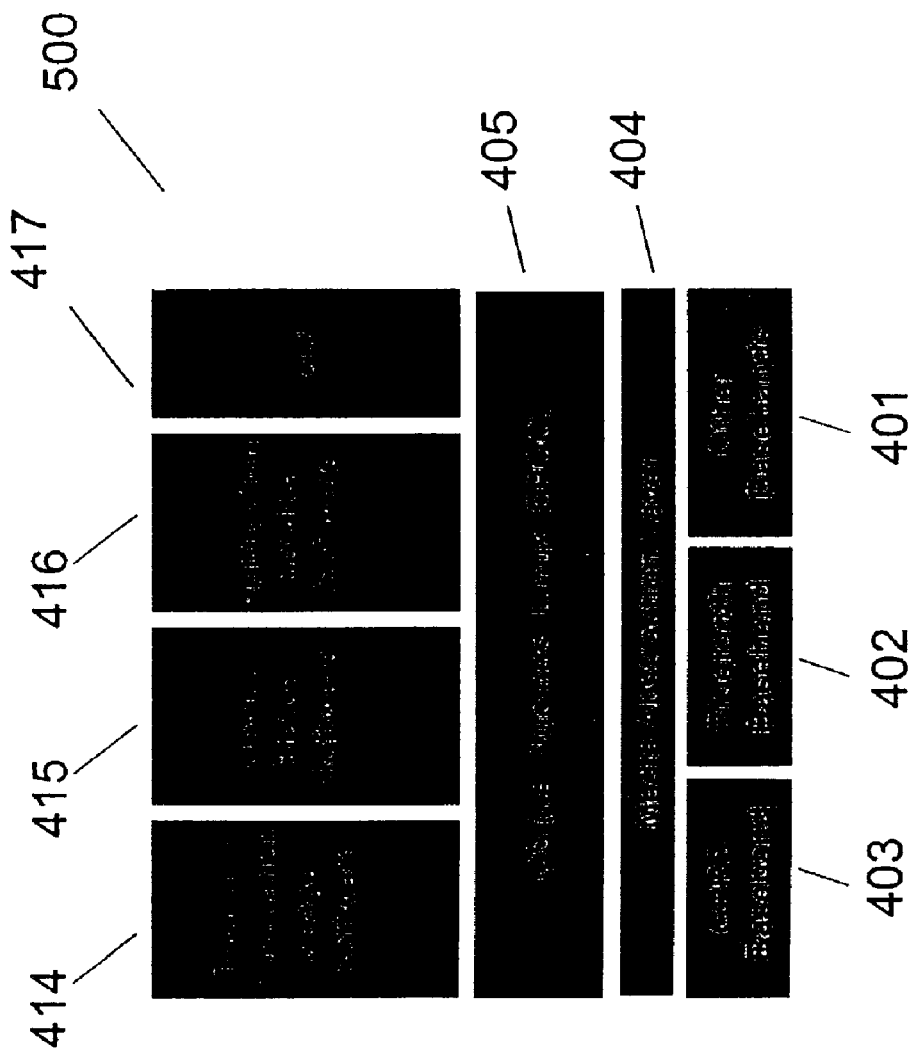
FIG. 4 is a software block diagram architecture for providing information from a short distance wireless network according to an embodiment of the present invention.

FIG. 4 illustrates a software architecture 500 for device 106 illustrated in FIG. 3a according to an embodiment of the present invention. In an embodiment of the present invention, software 500 is stored in FLASH memory 302 of device 106. In an alternate embodiment of the present invention, software components 414, 415 and 416 are stored in FLASH memory 353 in a terminal of terminals 107. In an embodiment of the present invention, software components referenced in FIG. 4 represent a software program, a software object, a software function, a software subroutine, a software method, a software instance, and a code fragment, singly or in combination. In an alternate embodiment, functions performed by software components illustrated in FIG. 4 are carried out completely or partially by hardware.

In an embodiment of the present invention, software 500, or components of software 500, is stored in an article of manufacture, such as a computer readable medium. For example, software 500 is stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination. In yet another embodiment, software 500, or components thereof, is downloaded from server 102 illustrated in FIG. 1*a*.

Software 500 includes telecommunication software or physical layer protocol stacks, in particular cellular communications software 403 and short-range radio communications software 402. In an embodiment, communication software 403 is a GPRS baseband software component used with processor 306 to transmit and receive cellular signals. In an embodiment, communication software 402 is a Bluetooth™ baseband software component used with processor 307 to transmit and receive short-range radio signals. Other telecommunication software may be used as illustrated by other basebands 401.

In an embodiment of the present invention, operating system ("OS") 405 is used to communicate with telecommunications software 402 and 403. In an embodiment of the present invention, operating system 405 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 405 manages hardware and enables execution space for device software components.

Media abstraction layer 404 allows operating system 405 to communicate with basebands 403, 402 and 401, respectively. Media abstraction layer 404 and other abstraction layers, described herein, translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Telecommunication usage software component 414 and device status software component 415 are used to provide information from a short distance wireless network 116 in order to make a business decision according to an embodiment of the present invention. In an alternate embodiment of the present invention, software components 414 and 415 are combined and/or partitioned into more software components. As described above application service software component 416 is loaded into device 106 or terminals 107 from server 101 in an embodiment of the present invention. In an alternate embodiment of the present invention, software components 414 and 415 are in either device 106 or in a single terminal, or combination of terminals, in terminals 107

In an embodiment of the present invention, telecommunication software component 414 keeps track of the usage of WAN 105 by device 106 and terminals 107. Telecommunication software component 414 stores which device or terminal in short distance wireless network 116 requested access to WAN 105, the type of data transferred and the period of time. This tracked usage information is then transferred to user database 604 in server 101, and in particular usage information 610*a*.

In an embodiment of the present invention, device status software component 415 keeps track of devices (including terminals 107) or batteries in short distance wireless network 116 that have failed or are about to fail. This status information is then transferred to user database 604 in server 101, and in particular status information 61*a*.

In an embodiment of the present invention, a device 106 and/or a terminal of terminals 107 in short distance wireless network 116 stores a threshold value. In order to determine a device/terminal's health or status, the threshold value is compared to a measured value. For example, a threshold value may include a predicted operation life in an embodiment of the present invention. Device status software component 415 compares an internal clock value with the threshold value containing the operation life of a device/terminal in order to generate an indication that a device/terminal has to be replaced. If a device/terminal internal clock value is greater than the threshold value a new device/terminal indication is generated. A similar threshold value and comparison is used for replacing batteries in an embodiment of the present invention.

In an embodiment of the present invention, telecommunication usage software component 414, device status software component 415, operating system 405 and Bluetooth™ Baseband software component 402 are used to generate and receive short-range radio signals 110 that include usage and status information.

Furthermore, Graphics User Interface ("GUI") 417 is provided to allow a user-friendly interface.

FIGS. 5*a*–*f* illustrate methods for making a business decision in response to information from a short distance wireless network 116 according to an embodiment of the present invention. In an embodiment, the methods are performed, in part or completely, by software components illustrated in FIGS. 4 and 6. In an embodiment of the present invention, a logic box or step illustrated in FIGS. 5*a*–*f* may represent an execution of a software component, such as a software program, a software object, a software function, a software subroutine, a software method, a software instance, a code fragment, singly or in combination. In an alternate embodiment of the present invention, a logic box or step represents execution of a software component, hardware operation or user operation, singly or in combination. In an alternate embodiment of the present invention, fewer or more logic boxes or steps are carried out in the methods illustrated in FIGS. 5*a*–*f*.

Figure 5A:
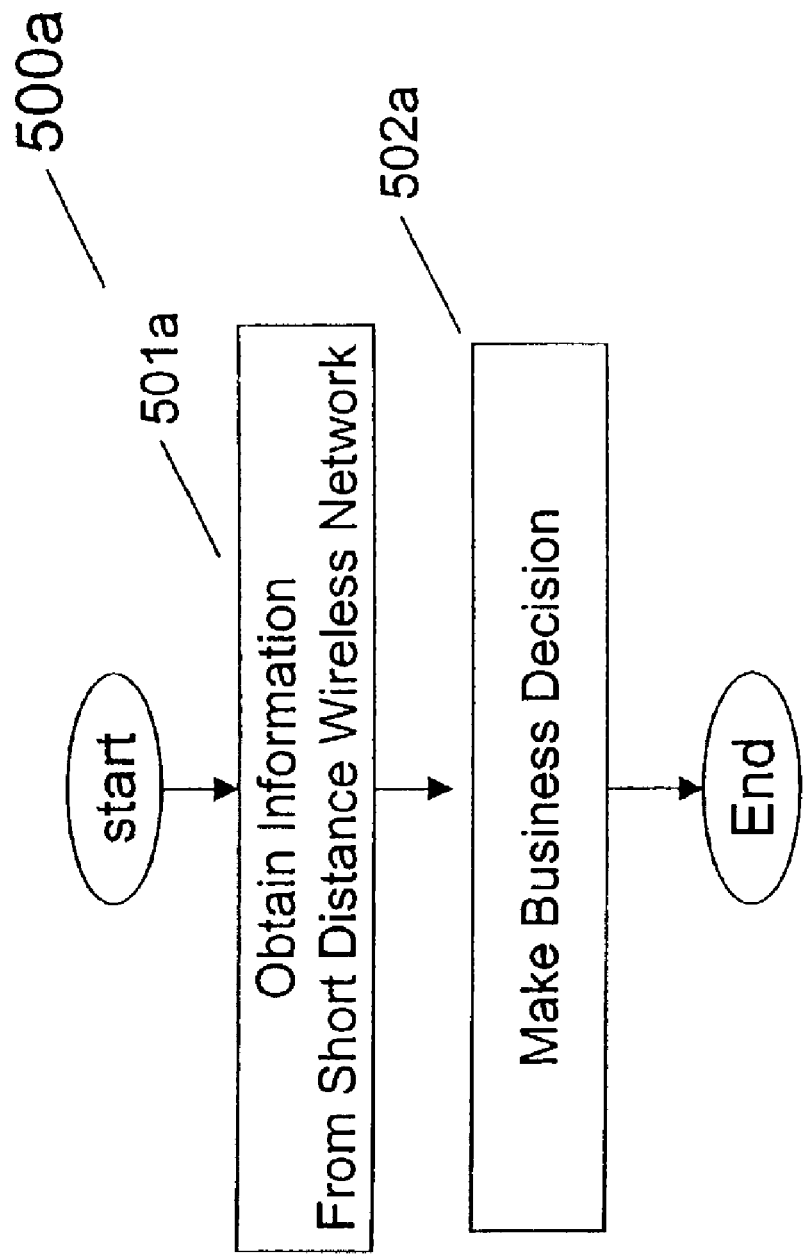
FIG. 5a is a flowchart illustrating making a business decision in response to information from a short distance wireless network according to an embodiment of the present invention.

FIG. 5*a* illustrates method 500*a* according to an embodiment of the present invention. Information from short distance wireless network 116 is obtained as illustrated by logic block 510*a*. As described above, the information is WAN usage information and/or status information of device 106 and terminals 107. A business decision is then made as illustrated by logic block 502*a*. As described above, a business decision includes providing an object to a user in an embodiment of the present invention. In alternate embodiments, an object is not provided.

FIG. 5*b* illustrates method 500*b* according to an embodiment of the present invention. Information is obtained as in method 500*a* and illustrated by logic block 501. A determination is made in logic block 502 whether user information, such as user database 604, is available. If user information is available, logic transitions to logic block 503; otherwise, control passes to logic block 504. In logic block 503, user information, such as usage information 610*a* and/or status information 611*a*, is obtained. A determination is made in logic block 504 whether an object is provided to a user or the public. If a an object is to be provided, control transitions to logic block 505 where an object is provided to a user or the public. Otherwise, method 500*b* ends.

Methods 505*c*–*f* in FIGS. 5*c*–*f*, respectfully, illustrate providing an object to a user, as illustrated by logic block 505 in FIG. 5*b*, in embodiments of the present invention. As one of ordinary skill in the art would appreciate, there are numerous other methods that are included in providing an object to a user which are within the scope of the present claims.

Figure 5C:
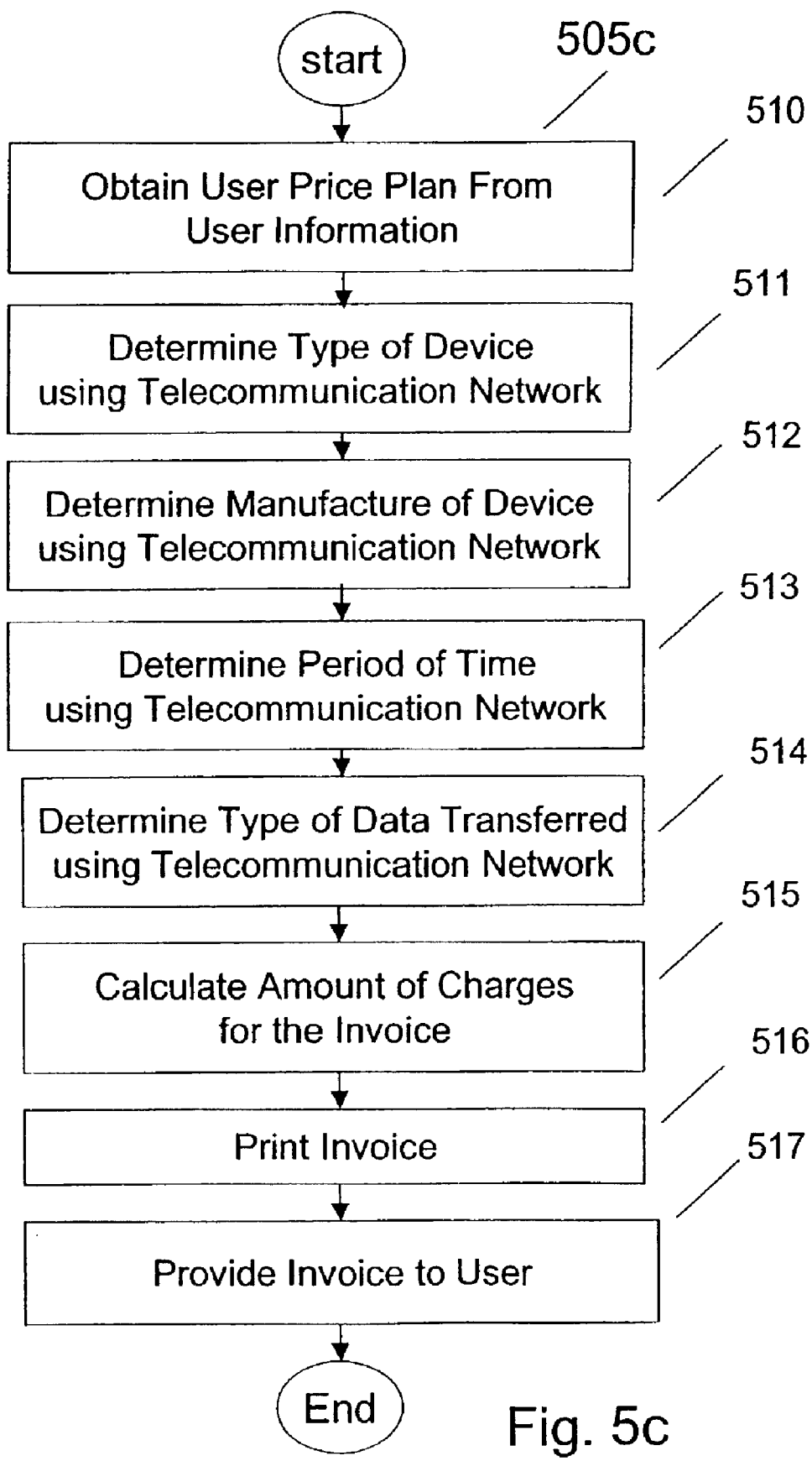

Method 505c, shown in FIG. 5c, illustrates providing an invoice 123 to a user 120 responsive to information from short distance wireless network 116. In an embodiment of the present invention, the information is obtained from device 106 that has stored usage information of device 106 and terminals 107. A price plan is obtained from user information, such as user database 604, as illustrated by logic block 510. A type of device using a telecommunication network, such as WAN 105, manufacture of the device, period of time of usage, and type of data transferred on the telecommunication network is determined in logic blocks 511–514. In an embodiment of the present invention, this information is stored in usage information 610a after being obtained from device 106. The amount of charges for each usage occurrence is determined as illustrated in logic block 515. In an embodiment of the present invention, a price plan and rate schedules in rate schedules software component 601 are used to calculate charges for invoice 123. An invoice 123 is printed as illustrated in logic block 516 and invoice 123 is provided to user 120 as illustrated by logic block 517.

Figure 5D:
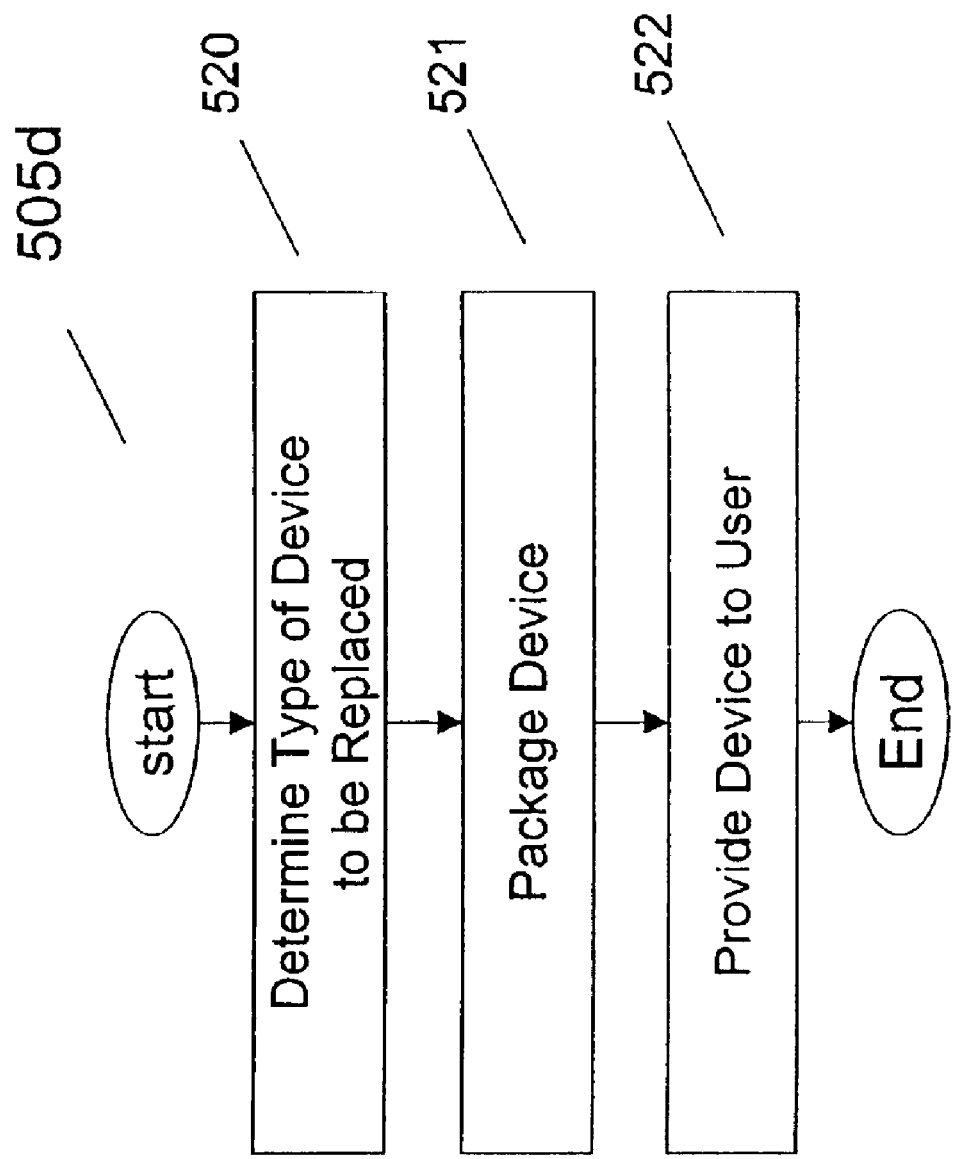

Method 505d, shown in FIG. 5d, illustrates providing a user 120 with a replacement device or replacement battery in response to information from a short distance wireless network 116. A determination of whether a replacement device or battery is needed in logic block 520. In an embodiment of the present invention, status information 610a is queried to determine if a device or battery needs to be replaced. Replacement plan 613a is then queried to determine if user 120 has signed up for or agreed to the replacement service. If user 120 has signed up for the replacement service, a replacement device or battery is packaged and mailed as illustrated by logic block 521 and 522. In an alternate embodiment of the present invention, manufacturers, distributors or retailers of replacement devices and replacement batteries perform logic blocks 521 and 522, respectively. Similarly, logic block 520 includes generating a message from operator 121 to manufactures, distributors or retailers of replacement devices and replacement batteries to provide the replacement device and/or battery to user 120.

Figure 5E:
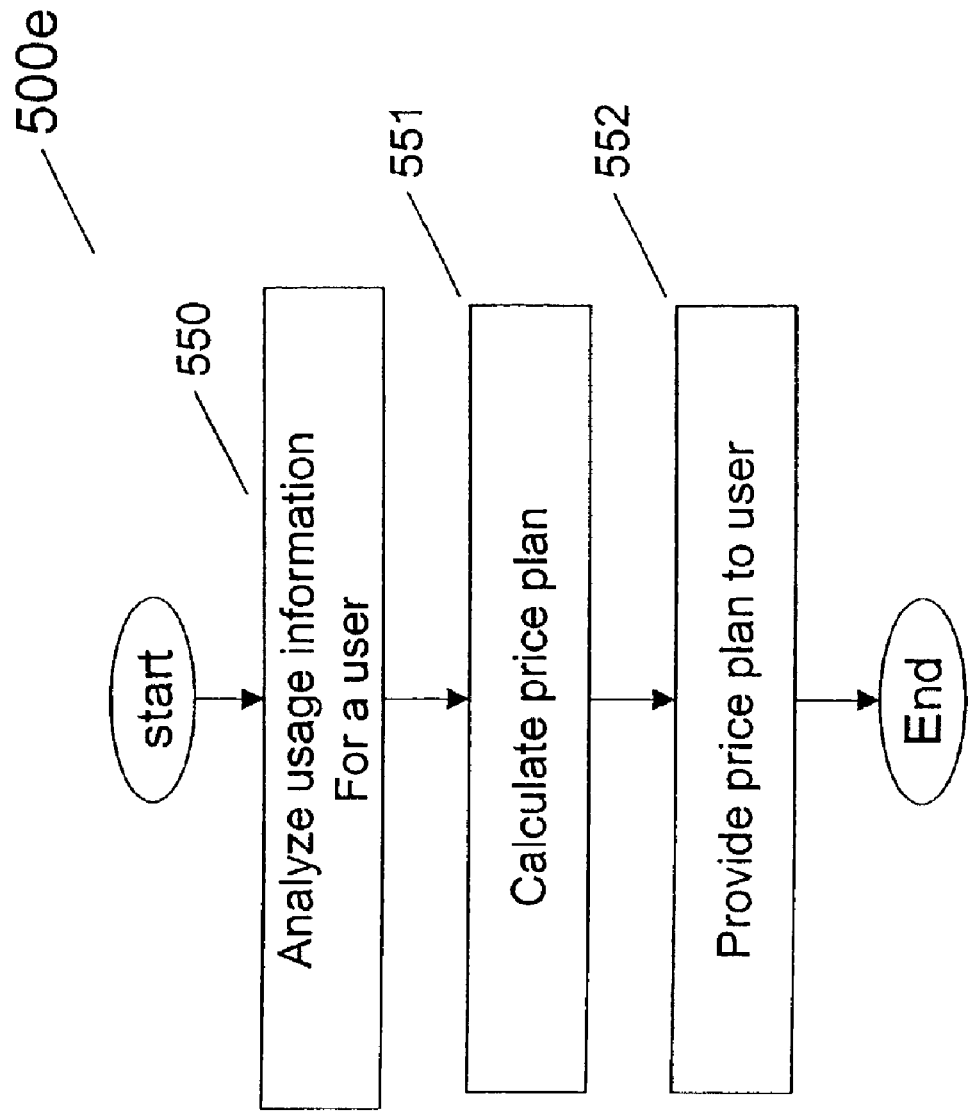

Method 500e, shown in FIG. 5e, illustrates providing a price plan 152 to a user 120 or potential user. Usage information is obtained as illustrated in logic block 550. In an embodiment of the present invention, usage information is obtained from usage information 610a in user database 604. A price plan 152 is then calculated as illustrated in logic block 551. For example, if user 120 rarely uses cellular telephone 106 and generates a large number of emails from PDA 107b, a price plan that caps charges for emails from PDA 107b and charges by the minute for voice usage on cellular telephone 106 would be calculated and provided to user 120 as illustrated by logic block 552. A price plan 152 may be hand delivered, verbalized, emailed or mailed to user 120 or a potential user in embodiments of the present invention. A promotional plan 151 may be similarly provided.

Figure 5F:
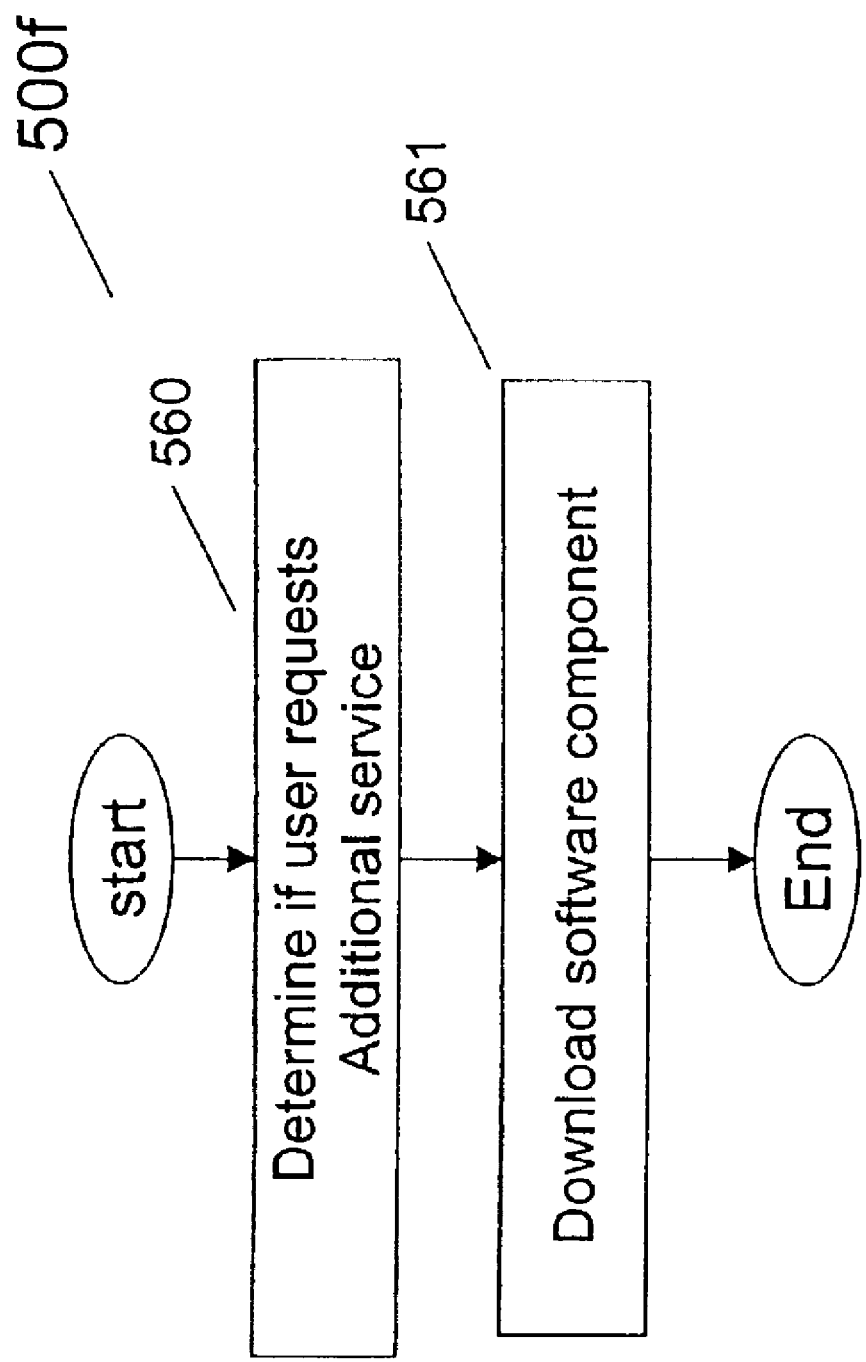

Method 500f, shown in FIG. 5f, illustrates downloading a software component 416 for adding service to short distance wireless network 116. A determination is made whether a user requests additional service as illustrated in logic block 560. In an embodiment of the present invention, user 120 mails, emails or telephones operator 121 to request the service. Application service software 416 is downloaded from server 101 by application service software component 602 as illustrated by logic block 561.

IV. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for providing a user with a battery, comprising the steps of:

generating a short-range radio signal, containing information regarding a battery life of a device, from the device in a short distance wireless network to a cellular device;

generating a cellular signal, containing the information, from the cellular device to a processing device in a wide area network; and, providing, by an entity, the user of the short distance wireless network with the battery for the device responsive to the information.

2. A method, comprising:

accessing a first server in a Wide Area Network ("WAN") from a first device, having a battery, in a short distance wireless network;

storing a usage information of the first device accessing the first server;

transferring the usage information to a second server in the WAN;

providing an invoice to a user of the short distance wireless network responsive to the usage information;

obtaining a battery information regarding a health of the battery in the first device;

transferring the battery information to a third server; and, providing a replacement battery to a user of the short distance wireless network responsive to the battery information.

3. The method of claim 2, wherein the storing step includes storing the usage information in a second device in the short distance wireless network and the transferring step includes transferring the usage information from the second device to the second server.

4. The method of claim 2, the second and third servers are the same servers.

* * * * *